UNITED STATES PATENT OFFICE.

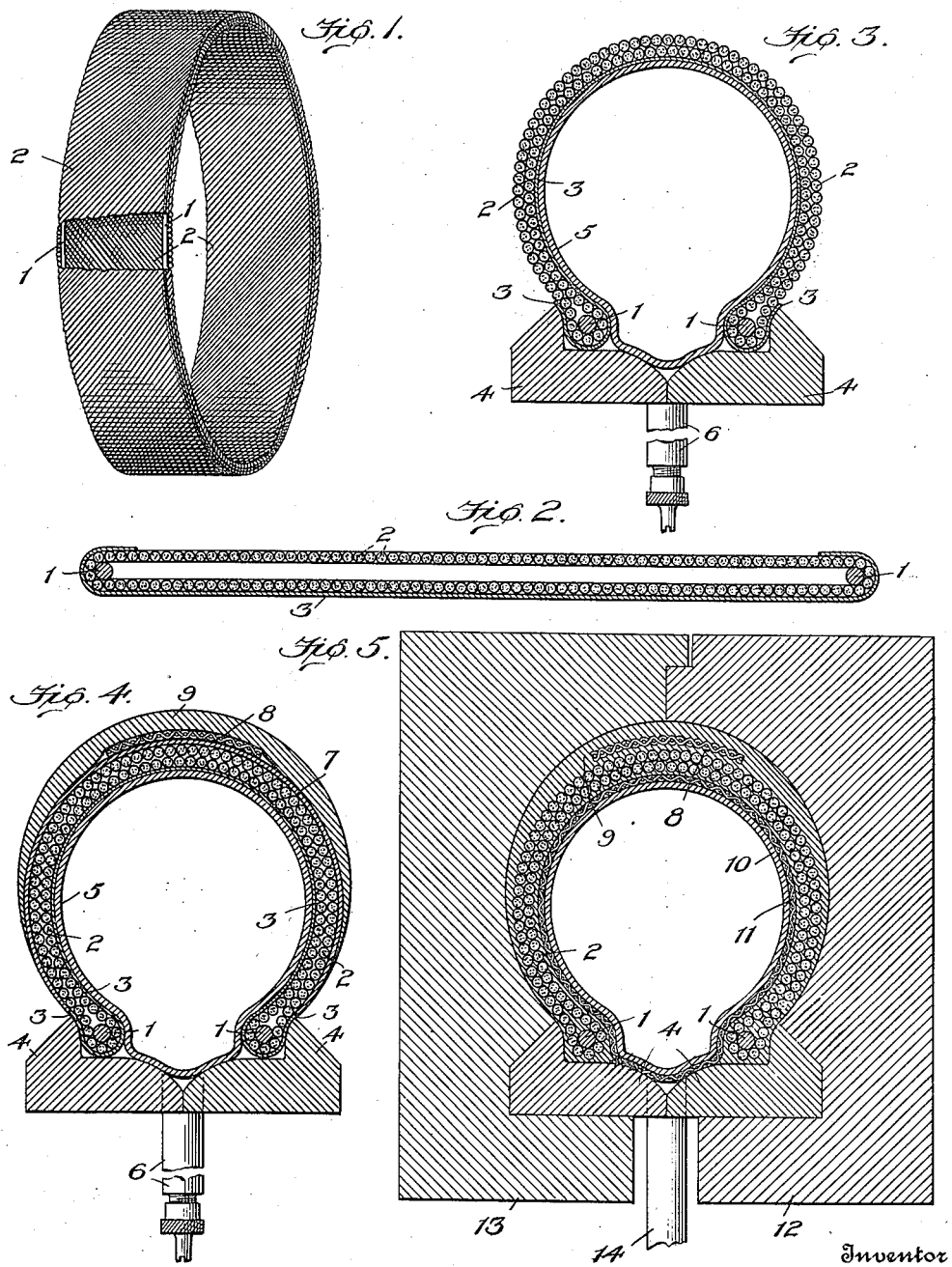

ARCHER H. HARRIS, OF YOUNGSTOWN, OHIO.

METHOD OF MANUFACTURING TIRES.

1,162,479.  Specification of Letters Patent.  Patented Nov. 30, 1915.

Application filed May 5, 1915. Serial No. 25,999.

*To all whom it may concern:*

Be it known that I, ARCHER H. HARRIS, a citizen of the United States, residing at Youngstown, in the county of Mahoning and State of Ohio, have invented certain new and useful Improvements in Methods of Manufacturing Tires; and I do hereby declare the following to be a full, clear, and exact description of the invention, such as will enable others skilled in the art to which it appertains to make and use the same.

My invention relates to the manufacture of pneumatic tires or outer casings, especially tires of the cord or thread-wound type, and has particular reference to a new and improved method of making same.

It is a well recognized fact that tires of the type mentioned are more efficient in point of speed, comfort and endurance, than those employing frictioned fabric as the basic material of construction. Obviously the fabric ordinarily employed in the manufacture of the carcasses renders the finished article comparatively stiff and unyielding. As a consequence fabric-built tires, upon contacting with road obstructions, must bodily surmount same, with more or less retardation according to the character and extent of such obstructions, and with more or less shock to car and occupants according to the speed with which it is moving. The more pliable and yielding cord-wound tires, on the contrary, accommodate themselves more readily to road obstructions and surface irregularities. For example, upon contacting with a relatively small stone the transversely arranged cords of a tire merely separate allowing such stone to become temporarily embedded in the tread surface of the tire, which thereupon rolls over it practically unobstructed, without shock and without appreciable loss of time or diminution of speed. Heretofore the methods employed for building cord-wound tires were that of winding, by machine or by hand, onto a suitable ring-core rubberized cords which were subsequently inclosed within a slab of tread rubber and thereafter vulcanized; or, similarly winding said cords in parallel arrangement and in zigzag form from bead to bead circumferentially around the entire structure; or, winding such cords back and forth over fastening pins or staples circumferentially arranged adjacent to both of the tire beads. In contradistinction to these, and all methods heretofore known, the present method of operation has been invented and will be hereinafter particularly described and pointed out by the claims following.

In the accompanying drawings which form part of this application for Letters Patent and whereon corresponding numerals indicate like parts in the several views: Figure 1 represents in perspective and upon a greatly reduced scale, a two-ply body material for tires, comprising a pair of spaced annular bead rings overwound by, and therefore inclosed within, a flat tubular body formed of cords, or a continuous cord, crossing the structure diagonally and in contact, extending around the entire circumference of said bead rings. Fig. 2 is a transverse sectional view, taken through Fig. 1, showing both bead rings, the cords inclosing said rings, and a skim coat of rubber crossing one surface of the tire material and overlapping it at both sides. Fig. 3 is also a transverse sectional view, showing a partial tire carcass blown into approximate shape upon an ordinary inner tube, and having its beads drawn together and held between suitable locking rings. Fig. 4 is also a transverse sectional view, corresponding with Fig. 3, except for the addition of an ordinary breaker strip, and an outer slab of tread rubber previous to vulcanization, and, Fig. 5 is also a transverse sectional view, corresponding with Fig. 4, except that a fabric-reinforced air bag has been substituted for the ordinary inner tube, and the entire structure is here shown inclosed within suitable mold members and finished by vulcanization.

Reference being had to the drawings and numerals thereon, 1, 1 indicate a pair of parallel spaced apart bead rings of steel, over which has been symmetrically and transversely wound cords, or a continuous cord, 2 previously rubberized, or impregnated with rubber solution, having its adjacent edges in contact and crossing the said rings 1, 1 at different angles upon opposite sides thereof as clearly shown by the broken away portion of Fig. 1 of the drawings. This overwinding of cords 2 results in a flat hollow tubular body material for the construction of tires or tire casings as shown by the drawings, and particularly by Figs. 1 and 2 thereof, wherein is illustrated a body material for two-ply tires; but obviously the number of plies may be variously increased according to requirements by similarly applying additional wrappings of cords 2. When this is done the angle at which such additional strands is applied should preferably be caused to cross that of the underlying ply, for reinforcing purposes, and while the cords 2 may readily be wound upon, or applied to, the rings 1, 1 by hand, this can more advantageously be accomplished by a machine such as set forth and described in my pending application for Letters Patent of the United States Serial No. 16,577. The body material having first been formed as shown by Fig. 1 of the drawings into a united annular but flat tubular mass, is next covered upon its inner periphery by a sheet of rubber 3 extending around the entire circumference of said body material, at its sides overlapping said material, as best shown by Fig. 2, and adhering to the cords 2 wherever it contacts with them. The inner surface of the said sheet of gum 3 is then soapstoned to render it non-adhesive, and bead rings 1, 1 are drawn toward each other by agency of oppositely disposed annular locking rings or bead positioning flanges 4, 4 to form a circular figure the cross sectional area of which is substantially convexo-concave in form. An ordinary inner tube 5, having a radially projecting valve stem 6, is thereupon inserted into the concavity of said body material, the locking rings or bead positioning flanges 4, 4 being closed to the position shown by Fig. 3, and the body material is inflated to practically its completed form by agency of said inner tube 5 in the ordinary and well understood manner.

As illustrated by Fig. 4 of the drawings the outside cords 2 of the tire carcass are next inclosed by an outer strip or strips 7 of sheet rubber which entirely surrounds and envelops the structure, upon which is centrally and circumferentially placed an encircling breaker strip 8 of suitable material, while outside of this is applied an inclosing slab or tread strip of uncured rubber 9 which is rolled down to approximate shape by means of hand rollers or by other means. The tire carcass is now roughly completed and ready for vulcanization or curing; locking rings 4, 4 with their bead positioning flanges are spread or separated, tube 5 is deflated and withdrawn, and a special tube or air bag 10, reinforced by one or more layers or plies of friction fabric 11 is substituted. Rings 4, 4 being again closed together the entire structure, including said rings, is then locked up between suitable mold members 12 and 13, as shown by Fig. 5, whereupon fluid pressure as from an air line (not shown) is introduced via the inlet 14, in which condition the tire is placed in a suitable heater or vulcanizer and cured, while thus maintained under internal fluid pressure.

Thus it will be observed that the important steps included in the present method may be briefly enumerated as follows: Forming an annular substantially flat body material for tires of gum-impregnated contacting adhesive cords, confining the edges of said material between annular bead positioning flanges, shaping said body material into the form of a tube open throughout its circumference at its inner periphery or base; inclosing said body material in a layer or layers of uncured rubber or analogous material, temporarily introducing into the carcass thus formed an annular air bag; applying fluid pressure to the interior of said air bag; and finally, curing the tire or casing while thus under internal pressure.

Obviously the tire carcass may be rag-wrapped, in the well understood manner, after inflation and before curing, as a substitute for the use of molds, these method steps being equally applicable to the present method of operation and regarded as equivalents one of the other. And while, as stated at the outstart, the present invention relates more especially to the construction of tires of the cord or thread-wound type, it is obviously applicable to tire casings wherein a body material of woven frictioned fabric is employed. In like manner various other modifications and equivalent substitutions may be resorted to without departing from the spirit of the invention, which invention having been thus described—

What I now claim and desire to secure by Letters Patent is:

1. A method of manufacturing pneumatic tires including the following steps, namely, forming an annular substantially flat body material, placing an air bag within said body material and confining the edges of said material between oppositely disposed bead positioning flanges, applying fluid pressure to the interior of said air bag, and finally curing the tire while thus under internal pressure.

2. A method of manufacturing pneumatic tires including the following steps, namely, forming an annular substantially flat body material, placing an air bag within said body material and confining the edges of said material between oppositely disposed bead positioning flanges, providing means for resisting radial expansion of the tire carcass beyond its normal limits, applying fluid pressure to the interior of said air bag, and finally curing the tire while thus under internal pressure.

3. A method of manufacturing pneumatic tires including the following steps, namely, forming an annular substantially flat body material, placing an air bag within said body material and confining the edges of said material between oppositely disposed sectional bead positioning flanges, applying fluid pressure to the interior of said air bag, and finally curing the tire while thus under internal pressure.

4. A method of manufacturing pneumatic tires including the following steps, namely, forming an annular substantially flat body material of cord strands, placing an air bag within said body material and confining the edges of said material between oppositely disposed separable bead positioning flanges, applying fluid pressure to the interior of said air bag, and finally curing the tire while thus under internal pressure.

5. A method of manufacturing pneumatic tires including the following steps, namely, forming an annular substantially flat body material of gum impregnated cord strands, placing an air bag within said body material and confining the edges of said material between oppositely disposed vertically divided bead positioning flanges, surfacing said body material with uncured rubber, applying fluid pressure to the interior of said air bag, and finally curing the tire while thus under internal pressure.

6. A method of manufacturing pneumatic tires including the following steps, namely, forming an annular substantially flat body material of gum impregnated cord strands adhesively joined, placing an air bag within said body material and confining the edges of said material between annular bead positioning flanges, surfacing said body material with uncured rubber, applying fluid pressure to the interior of said air bag, introducing the whole into a suitable mold, and finally curing the tire while thus under internal pressure.

7. A method of manufacturing pneumatic tires including the following steps, namely, forming an annular substantially flat body material comprising bead rings overwound by cord strands, placing an air bag within said body material and confining the edges of said material between annular bead positioning flanges, surfacing said body material with uncured rubber, applying fluid pressure to the interior of said air bag, introducing the whole into a suitable mold, and finally curing the tire while thus under internal pressure.

8. A method of manufacturing pneumatic tires including the following steps, namely, forming an annular substantially flat body material upon annular spaced apart bead rings, placing an air bag within said body material and confining the said bead rings between annular bead positioning flanges, surfacing said body material with uncured rubber of suitable thickness, applying fluid pressure to the interior of said air bag, introducing the whole into a suitable mold, and finally curing the tire while thus under internal pressure.

In testimony whereof I affix my signature, in presence of two subscribing witnesses.

ARCHER H. HARRIS.

Witnesses:
J. W. BLACKBURN,
C. A. RICE.